United States Patent
Yamaura et al.

(10) Patent No.: US 12,250,154 B2
(45) Date of Patent: Mar. 11, 2025

(54) COMMUNICATION CONTROL DEVICE, COMMUNICATION CONTROL METHOD, INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Takahiro Yamaura, Kawasaki Kanagawa (JP); Yasin Oge, Sagamihara Kanagawa (JP); Yuta Kobayashi, Ota Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 17/249,295

(22) Filed: Feb. 25, 2021

(65) Prior Publication Data
US 2021/0377189 A1    Dec. 2, 2021

(30) Foreign Application Priority Data

Jun. 1, 2020   (JP) .................................. 2020-095726

(51) Int. Cl.
*H04L 47/2441*   (2022.01)
*H04L 49/90*   (2022.01)

(52) U.S. Cl.
CPC .......... *H04L 47/2441* (2013.01); *H04L 49/90* (2013.01)

(58) Field of Classification Search
CPC ......... H04L 2463/101; H04L 2463/102; H04L 63/00; H04L 63/04; H04L 63/104; H04L 63/20; H04L 1/0061; H04L 12/02
See application file for complete search history.

(56) References Cited

U.S. PATENT DOCUMENTS 6,157,654 A * 12/2000 Davis .................. H04L 12/5602
370/428
10,511,455 B1 * 12/2019 Sharma .................. H04L 69/12
(Continued)

FOREIGN PATENT DOCUMENTS

JP        2018-125597 A    8/2018
WO   WO-2020143509 A1 *  7/2020 ........... H04L 47/125

OTHER PUBLICATIONS

IEEE Standards Association, "IEEE Standard for Local and metropolitan area networks—Bridges and Bridged Networks", IEEE Computer Society, IEEE Std. 802 1Q™-2018, 1993 pages (2018).
(Continued)

*Primary Examiner* — Wutchung Chu
*Assistant Examiner* — Berhanu D Belete
(74) *Attorney, Agent, or Firm* — Finnegan, Henderson, Farabow, Garrett & Dunner, LLP

(57) ABSTRACT

A communication control device according to an embodiment includes one or more hardware processors. The one or more hardware processors are configured to: perform control of transmission of messages by opening and closing a gate based on transmission permission information, the transmission permission information being generated based on gate control information including a plurality of entries for determining whether to open a plurality of gates corresponding to a plurality of queues, the transmission permission information indicating a time permitted to transmit messages in a period corresponding to one or more continuous entries or indicating an amount of transmittable messages in the period; and transmit and receive messages in accordance with the control.

22 Claims, 18 Drawing Sheets

(56) References Cited

U.S. PATENT DOCUMENTS

| | | | |
|---|---|---|---|
| 10,659,557 B2 * | 5/2020 | Oge | H04L 49/90 |
| 10,754,816 B2 * | 8/2020 | Kasichainula | H04L 12/4645 |
| 11,095,758 B2 * | 8/2021 | Masputra | H04L 47/283 |
| 11,755,517 B2 * | 9/2023 | Yamaura | G06F 13/1642 |
| | | | 710/308 |
| 11,811,665 B2 * | 11/2023 | Mardmoeller | H04L 47/622 |
| 2003/0076834 A1 * | 4/2003 | Davis | H04L 47/50 |
| | | | 370/468 |
| 2003/0095464 A1 * | 5/2003 | Huang | G06F 13/1689 |
| | | | 365/230.06 |
| 2006/0268736 A1 * | 11/2006 | Lee | H04H 20/55 |
| | | | 370/252 |
| 2007/0162642 A1 * | 7/2007 | Tousek | G06F 13/28 |
| | | | 710/22 |
| 2019/0104073 A1 * | 4/2019 | Choi | H04W 72/0446 |
| 2019/0121781 A1 * | 4/2019 | Kasichainula | G06F 15/17331 |
| 2019/0158620 A1 * | 5/2019 | Oge | H04L 49/3027 |
| 2019/0215832 A1 | 7/2019 | Nishimura | |
| 2019/0297025 A1 * | 9/2019 | Kobayashi | H04L 47/568 |
| 2019/0306076 A1 * | 10/2019 | Masputra | G06F 9/545 |
| 2019/0306282 A1 * | 10/2019 | Masputra | H04L 47/283 |
| 2020/0213148 A1 * | 7/2020 | Sano | H04L 12/4015 |
| 2020/0259896 A1 * | 8/2020 | Sachs | H04W 56/0065 |
| 2020/0296050 A1 * | 9/2020 | Oge | H04L 47/622 |
| 2020/0304429 A1 * | 9/2020 | Marcé | H04L 49/90 |
| 2020/0389405 A1 * | 12/2020 | Mardmoeller | H04L 47/34 |
| 2021/0377189 A1 * | 12/2021 | Yamaura | H04L 47/2441 |
| 2022/0197841 A1 * | 6/2022 | Yamaura | G06F 13/287 |

OTHER PUBLICATIONS

IEEE Standards Association, "IEEE Standard for Local and metropolitan area networks—Bridges and Bridged Networks, Amendment 26: Frame Preemption", IEEE Computer Society, IEEE Std. 802.1Qbu™-2014, 52 pages (2014).

IEEE Standards Association, "IEEE Standard for Local and metropolitan area networks-Bridges and Bridged Networks, Amendment 25: Enhancements for Scheduled Traffic", IEEE Computer Society, IEEE Std. 802.1Qbv™-2015, 57 pages (2015).

IEEE Standards Association, "IEEE Standard for Local and metropolitan area networks—Bridges and Bridged Networks, Amendment 26: Frame Preemption", IEEE Computer Society, IEEE Std. 802.1Qbu™- 2016, 52 pages (2016).

* cited by examiner

FIG.3

| | TC7 | TC6 | TC5 | TC4 | TC3 | TC2 | TC1 | TC0 | TIME INTERVAL |
|---|---|---|---|---|---|---|---|---|---|
| | | | | GATE STATE | | | | | |
| T00 | o | C | o | C | o | C | o | o | 128μs |
| T01 | C | o | o | o | o | o | o | o | 128μs |
| T02 | o | o | C | o | C | o | C | o | 512μs |
| T03 | o | o | C | o | C | o | C | o | 128μs |
| T04 | C | C | o | C | o | C | o | o | 128μs |
| T05 | o | C | o | C | o | C | o | o | 512μs |

FIG.9

| | GATE STATE | | | | | | | | TIME INTERVAL |
|---|---|---|---|---|---|---|---|---|---|
| | TC7 | TC6 | TC5 | TC4 | TC3 | TC2 | TC1 | TC0 | |
| T00 | o (128μs) | C | o (256μs) | C | o (256μs) | C | o (256μs) | o (∞) | 128μs |
| T01 | C | o (768μs) | o (128μs) | o (768μs) | o (128μs) | o (768μs) | o (128μs) | o (∞) | 128μs |
| T02 | o (640μs) | o (640μs) | C | o (640μs) | C | o (640μs) | C | o (∞) | 512μs |
| T03 | o (128μs) | o (128μs) | C | o (128μs) | C | o (128μs) | C | o (∞) | 128μs |
| T04 | C | C | o (896μs) | C | o (896μs) | C | o (896μs) | o (∞) | 128μs |
| T05 | o (640μs) | C | o (768μs) | C | o (768μs) | C | o (768μs) | o (∞) | 512μs |

FIG.10

FRAME TRANSMISSION PERMISSION TIME

| TIME | TC7 | TC6 | TC5 | TC4 | TC3 | TC2 | TC1 | TC0 |
|---|---|---|---|---|---|---|---|---|
| <128μs | 128μs | 0μs | 256μs | 0μs | 256μs | 0μs | 256μs | ∞ |
| <256μs | 0μs | 768μs | 128μs | 768μs | 128μs | 768μs | 128μs | ∞ |
| <768μs | 640μs | 640μs | 0μs | 640μs | 0μs | 640μs | 0μs | ∞ |
| <896μs | 128μs | 128μs | 0μs | 128μs | 0μs | 128μs | 0μs | ∞ |
| <1024μs | 0μs | 0μs | 896μs | 0μs | 896μs | 0μs | 896μs | ∞ |
| <1536μs | 640μs | 0μs | 768μs | 0μs | 768μs | 0μs | 768μs | ∞ |

FIG.11

| TIME | FRAME TRANSMISSION PERMISSION TIME | | | | | | | |
|---|---|---|---|---|---|---|---|---|
| | TC7 | TC6 | TC5 | TC4 | TC3 | TC2 | TC1 | TC0 |
| <128μs | 128μs | | 256μs | | 256μs | | 256μs | ∞ |
| <256μs | | 768μs | | 768μs | | 768μs | | |
| <768μs | 640μs | | | | | | | |
| <896μs | | | 896μs | | 896μs | | | |
| <1024μs | | | | | | | 896μs | |
| <1536μs | 640μs | | | | | | | |

FIG.12

| TIME | BYTES FOR FRAME TRANSMISSION | | | | | | | |
|---|---|---|---|---|---|---|---|---|
| | TC7 | TC6 | TC5 | TC4 | TC3 | TC2 | TC1 | TC0 |
| <128μs | 16000bytes | 0bytes | 32000bytes | 0bytes | 32000bytes | 0bytes | 32000bytes | 8 |
| <256μs | 0bytes | 96000bytes | 16000bytes | 96000bytes | 16000bytes | 96000bytes | 16000bytes | 8 |
| <768μs | 80000bytes | 80000bytes | 0bytes | 80000bytes | 0bytes | 80000bytes | 0bytes | 8 |
| <896μs | 16000bytes | 16000bytes | 0bytes | 16000bytes | 0bytes | 16000bytes | 0bytes | 8 |
| <1024μs | 0bytes | 0bytes | 112000bytes | 0bytes | 112000bytes | 0bytes | 112000bytes | 8 |
| <1536μs | 80000bytes | 0bytes | 96000bytes | 0bytes | 96000bytes | 0bytes | 96000bytes | 8 |

FIG.13

BYTES FOR FRAME TRANSMISSION

| TIME | TC7 | TC6 | TC5 | TC4 | TC3 | TC2 | TC1 | TC0 |
|---|---|---|---|---|---|---|---|---|
| <128μs | 16000bytes | | 32000bytes | | 32000bytes | | 32000bytes | 8 |
| <256μs | | 96000bytes | | 96000bytes | | 96000bytes | | |
| <768μs | 80000bytes | | | | | | | |
| <896μs | | | | | | | | |
| <1024μs | | | 112000bytes | | 112000bytes | | 112000bytes | |
| <1536μs | 80000bytes | | | | | | | |

FIG.14

| BYTES | BYTES FOR FRAME TRANSMISSION | | | | | | | |
|---|---|---|---|---|---|---|---|---|
| | TC7 | TC6 | TC5 | TC4 | TC3 | TC2 | TC1 | TC0 |
| <16000bytes | 16000bytes | 0bytes | 32000bytes | 0bytes | 32000bytes | 0bytes | 32000bytes | ∞ |
| <32000bytes | 0bytes | 96000bytes | 16000bytes | 96000bytes | 16000bytes | 96000bytes | 16000bytes | ∞ |
| <96000bytes | 80000bytes | 80000bytes | 0bytes | 80000bytes | 0bytes | 80000bytes | 0bytes | ∞ |
| <112000bytes | 16000bytes | 16000bytes | 0bytes | 16000bytes | 0bytes | 16000bytes | 0bytes | ∞ |
| <128000bytes | 0bytes | 0bytes | 112000bytes | 0bytes | 112000bytes | 0bytes | 112000bytes | ∞ |
| <192000bytes | 80000bytes | 0bytes | 96000bytes | 0bytes | 96000bytes | 0bytes | 96000bytes | ∞ |

FIG.15

| BYTES | TC7 | TC6 | TC5 | TC4 | TC3 | TC2 | TC1 | TC0 |
|---|---|---|---|---|---|---|---|---|
| <16000bytes | 16000bytes | | | | | | | |
| <32000bytes | | 96000bytes | 32000bytes | | 32000bytes | | 32000bytes | 8 |
| <96000bytes | 80000bytes | | | 96000bytes | | 96000bytes | | |
| <112000bytes | | | | | | | | |
| <128000bytes | | | 112000bytes | | 112000bytes | | 112000bytes | |
| <192000bytes | 80000bytes | | | | | | | |

BYTES FOR FRAME TRANSMISSION

COMMUNICATION CONTROL DEVICE, COMMUNICATION CONTROL METHOD, INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2020-095726, filed on Jun. 1, 2020; the entire contents of which are incorporated herein by reference.

FIELD

Embodiments described herein relate generally to a communication control device, a communication control method, an information processing device, an information processing method, and a computer program product.

BACKGROUND

There are known communication apparatuses that are compatible with time-sensitive networking (TSN) standard and the like and performs real-time communication over a network. According to the TSN, a gate control list that describes enabling/disabling transmission of a queue by time unit determines enabling/disabling transmission of a frame, and thereby timing and an amount of transmission are controlled.

However, the conventional art cannot effectively use a communication resource in some cases.

BRIEF DESCRIPTION OF THE DRAWINGS

FIG. 3 is a table illustrating an example of a gate control list;

FIG. 9 is a table illustrating an example of calculated times;

FIG. 10 is a table illustrating an example of generated transmission permission information;

FIG. 11 is a table illustrating an example of generated transmission permission information;

FIG. 12 is a table illustrating an example of generated transmission permission information;

FIG. 13 is a table illustrating an example of generated transmission permission information;

FIG. 14 is a table illustrating an example of generated transmission permission information;

FIG. 15 is a table illustrating an example of generated transmission permission information;

DETAILED DESCRIPTION

Figure 1:
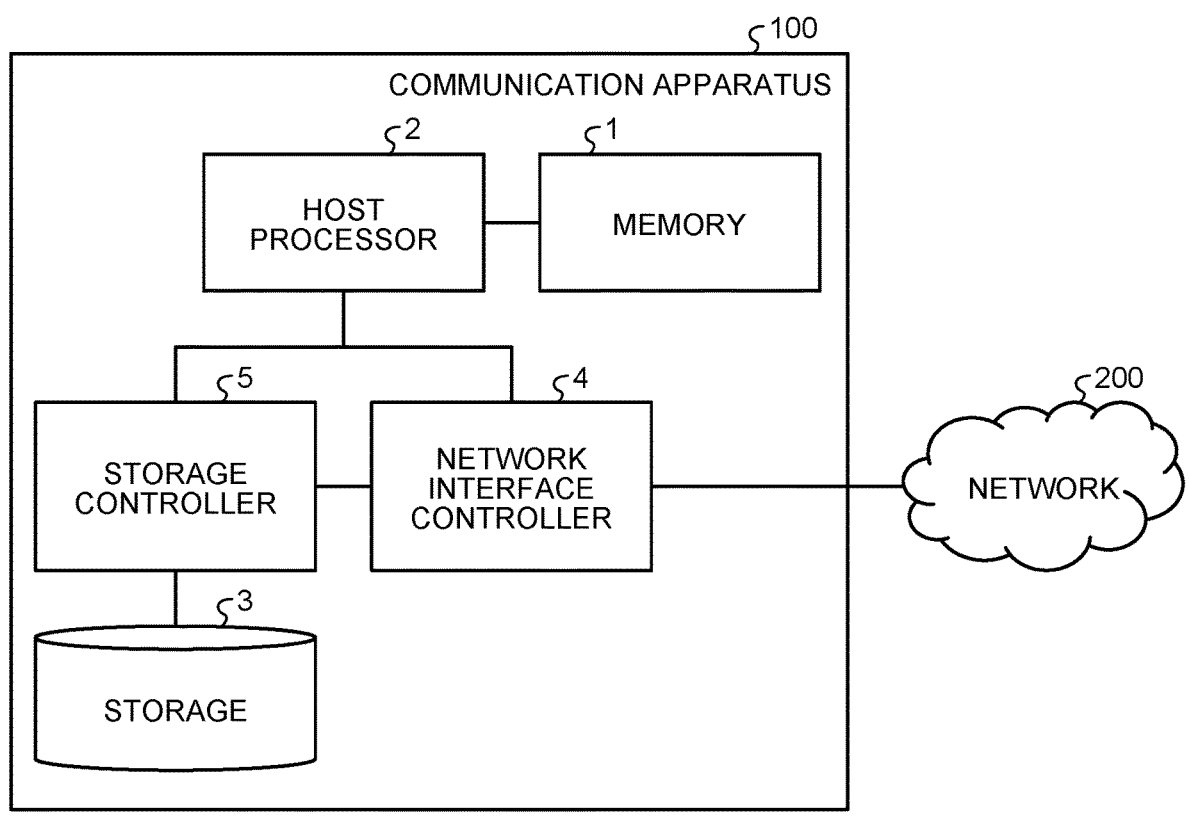
FIG. 1 is a hardware configuration diagram of a communication apparatus according to an embodiment.

A communication control device according to an embodiment includes one or more hardware processors. The one or more hardware processors are configured to: perform control of transmission of messages by opening and closing a gate based on transmission permission information, the transmission permission information being generated based on gate control information including a plurality of entries for determining whether to open a plurality of gates corresponding to a plurality of queues, the transmission permission information indicating a time permitted to transmit messages in a period corresponding to one or more continuous entries or indicating an amount of transmittable messages in the period; and transmit and receive messages in accordance with the control.

Preferred embodiments of a communication control devices, a communication control method, an information processing device, an information processing method, and a computer program product according to the present disclosure will be described in detail below with reference to the accompanying drawings. In the following description, an example of using TSN as a standard of real-time communication will be mainly described, but the applicable standard is not limited to TSN.

TSN uses a gate control list (an example of gate control information) that includes a plurality of entries for determining whether to open a plurality of gates corresponding to a plurality of queues. According to TSN, in a gate open duration (during which a gate remains open), each of the queues is permitted to transmit frames (an example of messages) over two or more entries until a corresponding gate is finally closed. With the standard of TSN, a gate switching interval can be set with a granularity of 1 ns. Therefore, when the gate interval is short, a given communication resource can be effectively used by determining whether to permit transmission while checking the plurality of entries.

When the opening and closing of gates is controlled according to the gate control list stored in a format defined in the TSN standard, it is necessary to perform processing of determining whether a frame is permitted to be transmitted while reading a forward gate state (gate state at the time after the current time). However, such a configuration cannot ensure that this process is finished within a certain period of time. In addition, when a forward gate state is not taken into consideration to avoid this problem, there is a problem that the communication resource cannot be effectively used.

Considering above, the communication apparatus according to the present embodiment does not directly use the original gate control list, but uses information obtained by converting the gate control list in advance into a format suitable for hardware processing by software or the like. Specifically, transmission permission information is generated from the original gate control list. The transmission permission information indicates a time permitted to transmit messages, or indicates an amount of transmittable message during a gate open duration. The communication apparatus transmits messages on the basis of the transmission permission information. This makes it possible to finish a transmission control process within a certain period of time and the communication resource is effectively used.

FIG. 1 is a diagram illustrating an example of a hardware configuration of the communication apparatus according to the present embodiment. The communication apparatus according to the present embodiment includes a memory 1, a host processor 2, a storage 3, a network interface controller 4, and a storage controller 5.

The memory 1 is connected to the host processor 2 via a memory controller in the host processor 2. The memory 1 is implemented by, for example, dynamic random access memory (DRAM) and the like.

The host processor 2 is connected to the storage controller 5 by using a bus system such as PCI Express (registered trademark). Likewise, the host processor 2 is connected to the network interface controller 4 by using a bus system such as PCI Express (registered trademark).

The host processor 2 loads, on the memory 1, an image of an execution program stored in the storage 3 and executes processing while reading out instructions and data from the memory 1. The processing is executed by one or more cores included in the host processor 2. Note that, in FIG. 1, while the memory 1 and the host processor 2 are illustrated separately, a configuration implemented by combining the memory 1 and host processor 2 of FIG. 1 is referred to as a host processor (host processor 2, host processor 2-2, and host processor 2-3) in FIG. 2 and subsequent figures.

The storage 3 is implemented by, for example, a hard disk drive (HDD) or solid state drive (SSD). The storage 3 is connected to the storage controller 5 according to standards such as SATA, SAS, and U.2 (SFF-8639). Furthermore, the storage 3 and the storage controller 5 may be integrated with each other.

The network interface controller 4 connects the host processor 2 to the network 200.

The network 200 is, for example, Ethernet (registered trademark). Specifically, the network 200 is a network corresponding to a standard defined by IEEE 802.1. The standard defined by IEEE 802.1 is, for example, Audio Video Bridging (AVB) standard, Time-Sensitive Networking (TSN) standard, or the like. Furthermore, the network 200 may be any type. The network 200 includes, for example, an office network, a network inside a data center, an in-vehicle network, a network in a factory, a network for a mobile phone base station, a network for a core facility, or the like.

The network interface controller 4 and the storage controller 5 are implemented by, for example, an application specific integrated circuit (ASIC), a field-programmable gate array (FPGA), or the like. Furthermore, the network interface controller 4 and the storage controller 5 may be implemented by a combination of two or three of ASIC, FPGA, and a processor. Furthermore, the network interface controller 4 and the storage controller 5 may include a built-in memory different from the memory 1 described above. Furthermore, the network interface controller 4 and the storage controller 5 may be mounted as a chip separate from the host processor 2, or may be mounted as one chip as a system-on-a-chip (SoC).

Figure 2:
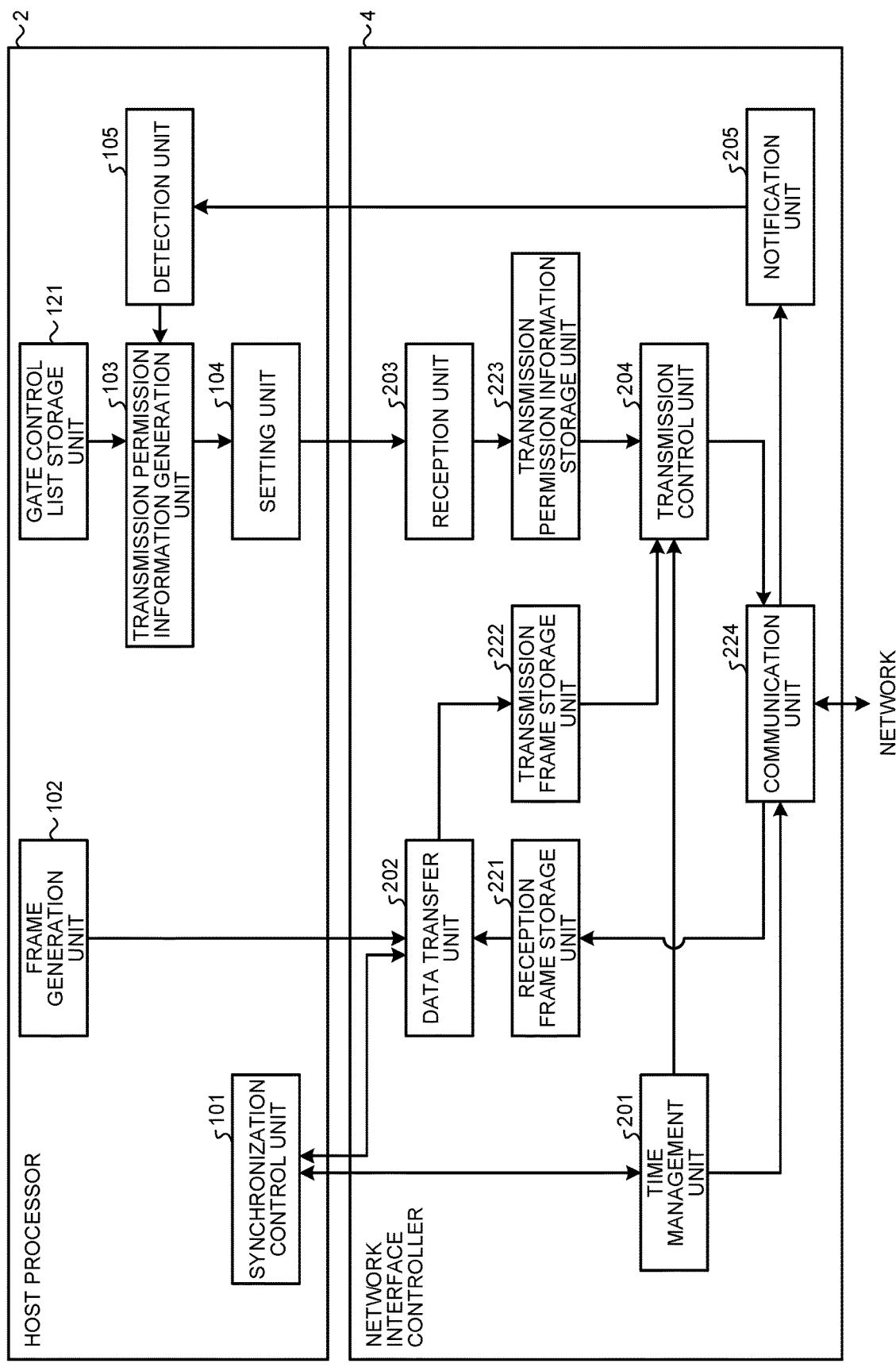
FIG. 2 is a block diagram of the communication apparatus according to the embodiment.

FIG. 2 is a block diagram illustrating an example of a functional configuration of a communication apparatus 100 according to the present embodiment. Note that FIG. 2 mainly illustrates an example of functional configurations of the host processor 2 (an example of information processing device) and network interface controller 4 (an example of communication control device) that are included in the communication apparatus 100.

As illustrated in FIG. 2, the host processor 2 includes a synchronization control unit 101, a frame generation unit 102, a transmission permission information generation unit 103, a setting unit 104, a detection unit 105, and a gate control list storage unit 121.

The gate control list storage unit 121 stores a gate control list used when performing transmission control. The gate control list storage unit 121 is implemented by, for example, the memory 1. The gate control list is information used to execute control of Enhancements for scheduled traffic that is defined in IEEE 802.1Q.

The gate control list may be stored in the storage 3 in advance or, for example, may be input from the network 200 by using centralized network configuration (CNC) defined by IEEE 802.1Qcc.

FIG. 3 is a table illustrating an example of a gate control list. The gate control list illustrated in FIG. 3 includes six entries from T00 to T05. Each entry includes: gate states of queues corresponding to eight traffic classes; and a time interval. TC0 to TC7 indicate traffic classes. For example, TC7 indicates the seventh traffic class. The gate state of each traffic class is indicated by either "o" or "C". An opened gate is indicated by "o". A closed gate is indicated by "C". The gate states each indicates whether transmission in a queue for a traffic class is permitted.

The time interval represents a duration of each entry. In the example of FIG. 3, the time interval of the entry T00 is set to 128 μs. This means that the entry T00 continues for 128 μs. The gate state is maintained during the corresponding time interval sequentially from T00, the gate state of the gate for each traffic class is switched between "o" and "C" as time passes in the order of T01, T02, . . . , T05. When the last entry (T05 in the example of FIG. 3) is finished, the process returns to the entry T00, and the process is repeated.

Although not illustrated in FIG. 3, in the gate control list, the time (base time) at which gate control is started is also set (stored). The base time is included in the transmission permission information and transmitted to the network interface controller 4. The base time is represented by, for example, the year, the month, the day, the hour, the minute, and the second, but any format may be used as long as the time to start gate control can be identified.

Returning to FIG. 2, the synchronization control unit 101 performs time synchronization with another communication apparatus over the network 200. For example, the synchronization control unit 101 performs time synchronization over the network 200, in accordance with a time synchronization protocol such as IEEE1588 or IEEE802.1AS, and corrects the time information managed by the network interface controller 4 (a time management unit 201 described later).

The frame generation unit 102 generates a frame to be transmitted (a transmission frame). For example, the frame generation unit 102 generates data to be included in the transmission frame and a header and a footer according to a protocol of an upper layer of Ethernet. The frame generation unit 102 is implemented by, for example, a transmission application, a protocol stack, and a device driver, each running on the host processor 2.

While only one frame generation unit 102 is illustrated in FIG. 2, a plurality of the frame generation units 102 may be provided. The frame generation unit 102 sets a traffic class ono a transmission frame based on a characteristic or the like of information to be transmitted. When the eight traffic classes are used, values from 0 to 7, for example, are used as identification information for those traffic classes.

The transmission permission information generation unit 103 generates transmission permission information from the gate control list. For example, upon initialization and when a change in link speed is detected by the detection unit 105, the transmission permission information generation unit 103 reads the gate control list from the gate control list storage unit 121 and generates the transmission permission information. The link speed represents the speed of communication over the network 200 by the network interface controller 4 (a communication unit 224 described later). The process of generating the transmission permission information will be described in detail later.

The setting unit 104 transmits the generated transmission permission information to the network interface controller 4 (a reception unit 203 described later).

The detection unit 105 detects a change in the link speed of the network interface controller 4. For example, the detection unit 105 receives a notification from the network interface controller 4 (a notification unit 205 described later) and detects a change in the link speed.

The units described above (the synchronization control unit 101, the frame generation unit 102, the transmission permission information generation unit 103, the setting unit 104, and the detection unit 105) are implemented by, for example, one or more processors. For example, the above-mentioned units may be implemented by causing a processor such as a central processing unit (CPU) to execute a program, that is, by software. Each of the above-mentioned units may be implemented by a processor such as a dedicated integrated circuit (IC), that is, by hardware. Each of the above-mentioned units may be implemented by the software and the hardware in combination. When a plurality of processors is used, each of the processors may implement one of the units or may implement two or more of the units.

As illustrated in FIG. 2, the network interface controller 4 includes the time management unit 201, a data transfer unit 202, the reception unit 203, a transmission control unit 204, the notification unit 205, a reception frame storage unit 221, a transmission frame storage unit 222, a transmission permission information storage unit 223, and the communication unit 224.

The communication unit 224 includes functions called a media access controller (MAC) and PHY, and performs processing necessary to transmit and receive frames according to a data link layer protocol and physical layer protocol in the network 200. For example, the communication unit 224 performs Ethernet data link layer and physical layer processing.

The reception frame storage unit 221 stores a reception frame received by the communication unit 224. For example, the reception frame storage unit 221 uses queues (FIFO) prepared for the respective traffic classes to sequentially store sets of the data and frame lengths of the reception frames.

The transmission frame storage unit 222 stores a transmission frame generated by the frame generation unit 102 of the host processor 2. For example, the transmission frame storage unit 222 uses queues (FIFO) prepared for the respective traffic classes to sequentially store sets of the data and frame lengths of the transmission frames.

The reception frame storage unit 221 and the transmission frame storage unit 222 are implemented by, for example, a static random access memory (SRAM).

The time management unit 201 manages time information. For example, the time management unit 201 manages the time of the network interface controller 4 and provides the time information to the communication unit 224 and the transmission control unit 204.

Furthermore, when the synchronization control unit 101 performs time synchronization, the communication unit 224 uses time information of the time management unit 201 to add a time stamp to a transmission frame and to acquire a time stamp from a reception frame.

The data transfer unit 202 transfers data to and from the memory 1. For example, the data transfer unit 202 transfers a frame between the reception frame storage unit 221 and the memory 1 and between the memory 1 and the transmission frame storage unit 222 by direct memory access (DMA).

In reception processing, the data transfer unit 202 reads out a transfer destination address from a receive descriptor (details will be described later), and writes the data of a reception frame read from a corresponding queue of the reception frame storage unit 221 in an area of the memory 1 specified by the transfer destination address. Then, the data transfer unit 202 writes the length and status of the receive descriptor.

In transmission processing, the data transfer unit 202 reads out a transfer source address and the length, from a transmit descriptor (details will be described later), reads data of the length specified, from an area of the memory 1 specified by a transfer source address, and writes the data of a frame in a corresponding queue of the transmission frame storage unit 222. Then, the data transfer unit 202 writes the status of the transmit descriptor.

Transmission and reception of frames according to the time synchronization protocol are also performed via the data transfer unit 202. For example, the synchronization control unit 101 calculates a time offset with respect to a master connected over the network 200, from a time stamp of each frame, and corrects the time information of the time management unit 201.

Figure 4:
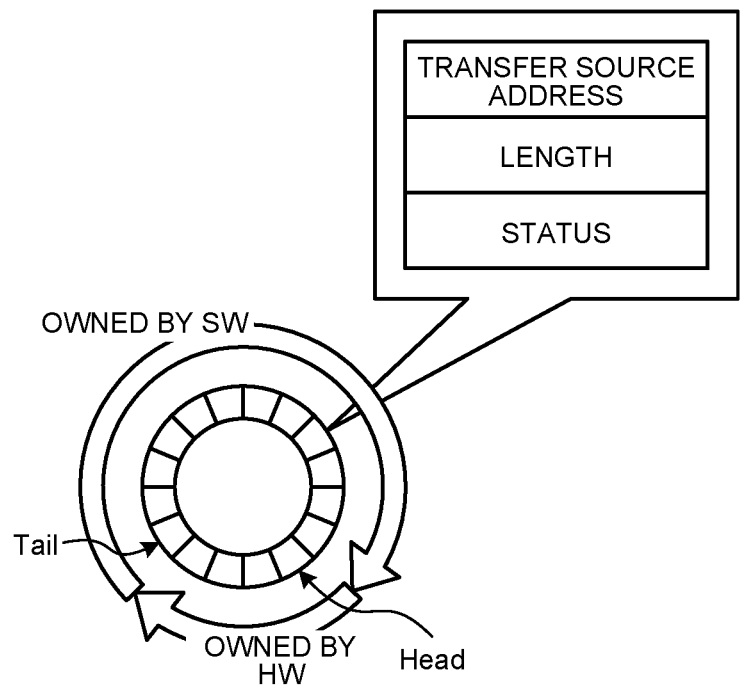
FIG. 4 is a diagram illustrating a configuration example of a transmit descriptor ring.
Figure 5:
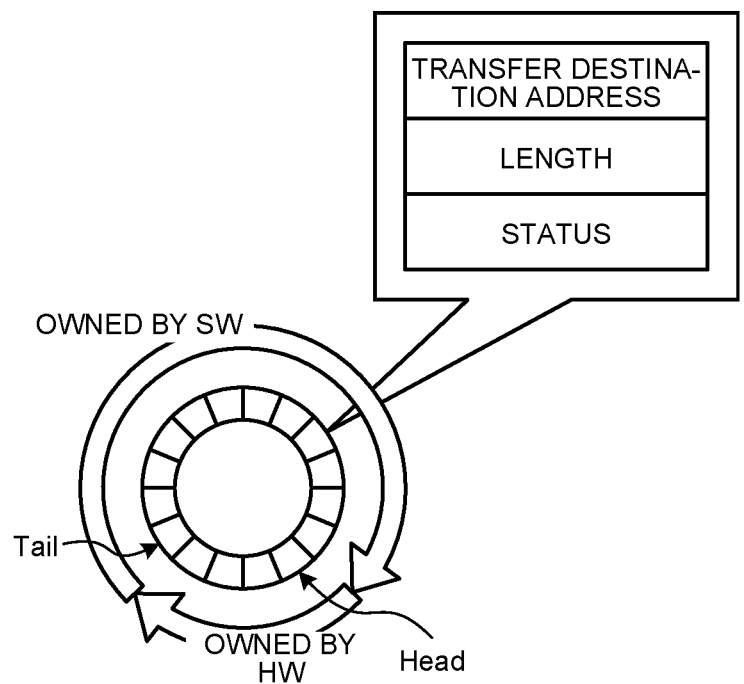
FIG. 5 is a diagram illustrating a configuration example of a receive descriptor ring.

FIGS. 4 and 5 are diagrams illustrating configuration examples of a transmit descriptor ring and a receive descriptor ring.

As illustrated in FIG. 4, transmit descriptors forms a ring buffer and are managed by using two variables, called Head and Tail. As illustrated in FIG. 4, descriptors from Head to Tail-1 represent descriptors owned by HW (hardware), that is, the network interface controller 4. Furthermore, descriptors from Tail to Head-1 represent descriptors owned by SW (software), that is, software (the frame generation unit 102 and the synchronization control unit 101) operating on the host processor 2. The values of the Head and Tail are communicated between the network interface controller 4 and the host processor 2 by using a register interfaces and an interrupt signal.

Each entry (each descriptor) of the transmit descriptor ring includes a transfer source address, length, and status. The transfer source address indicates a starting address indicating the start position of a storage area of a data storage unit (e.g., the memory 1) in which the data of a frame as a transmission target is stored. The length indicates the length of the frame as the transmission target. For the status, information indicating a status of a transmission process is stored.

As illustrated in FIG. 5, each entry (each descriptor) of the receive descriptor ring includes a transfer destination address, length, and status. The transfer destination address indicates a starting address indicating the start position of a storage area of a data storage unit (e.g., the memory 1) in which the data of a frame as a reception target is stored. The length indicates the length of the frame as the reception target. For the status, information indicating a status of a reception process is stored.

The status described above includes, for example, an error bit and a DONE bit. The error bit indicates the presence or absence of a transfer error. The DONE bit indicates that processing in the network interface controller 4 has been finished. When the DONE bit of a transmit descriptor is 1, which indicates that the transmission process is finished. When the DONE bit of a receive descriptor is 1, which indicates that the reception process is finished. The network interface controller 4 writes 1 to each bit (error bit and DONE bit). Then, the frame generation unit 102 or the synchronization control unit 101 checks each bit and writes 0 to each bit to clear each bit.

Returning to FIG. 2, the reception unit 203 receives an input of transmission permission information transmitted by the setting unit 104 of the host processor 2. The reception unit 203 may be configured to set the transmission permission information by using a register defined beforehand. The setting unit 104 may notify of the starting address and length of the transmission permission information that is stored in the memory 1 in a predetermined format by the register, the reception unit 203 accessing the memory 1 and reading the transmission permission information. The set transmission permission information is output to the transmission permission information storage unit 223.

The transmission control unit 204 performs transmission control according to Enhancements for scheduled traffic. For example, the transmission control unit 204 uses time information managed by the time management unit 201, transmission permission information, and the size of the first frame in a queue of each traffic class stored in the transmission frame storage unit 222 to perform transmission control according to Enhancements for scheduled traffic.

Note that a transmission selection algorithm that is applied to the transmission control may employ any algorithm. For example, the transmission control unit 204 is configured to apply "strict priority" (absolute priority) to all traffic classes.

An overview of the transmission control process will be described below. First, the transmission control unit 204 checks whether acquired time information corresponds to which entry of the transmission permission information and calculates a transmittable amount in each queue at that time, that is, a transmittable amount in each traffic class. The transmission control unit 204 determines whether the first frame can be transmitted in each queue on the basis of the transmittable amount. In a case where "strict priority" is set as the transmission selection algorithm, the transmission control unit 204 selects a traffic class having maximum identification information of a traffic class from among traffic classes corresponding to queues in which the first frames can be transmitted. The transmission control unit 204 transmits a frame via the communication unit 224 by using a queue corresponding to the selected traffic class.

The notification unit 205 acquires the link status and the link speed of the communication unit 224 and notifies the host processor 2 (detection unit 105) of the link status and link speed. An interrupt may be used for the notification, or the detection unit 105 may be caused to be operated for polling.

The transmission permission information storage unit 223 stores transmission permission information that is transmitted from the setting unit 104 of the host processor 2 and received by the reception unit 203 so that the transmission control unit 204 can read the transmission permission information. The transmission permission information storage unit 223 is implemented by, for example, SRAM.

Each of the units described above (the time management unit 201, data transfer unit 202, reception unit 203, transmission control unit 204, and notification unit 205) is implemented by, for example, one or more processors. For example, each of the above-mentioned units may be implemented by causing a processor such as a CPU to execute a program, that is, by software. Each of the above-mentioned units may be implemented by a processor such as a dedicated IC, that is, by hardware. Each of the above-mentioned units may be implemented by the software and the hardware in combination. When a plurality of processors is used, each of the processors may implement one of the units or may implement two or more of the units.

Figure 6:
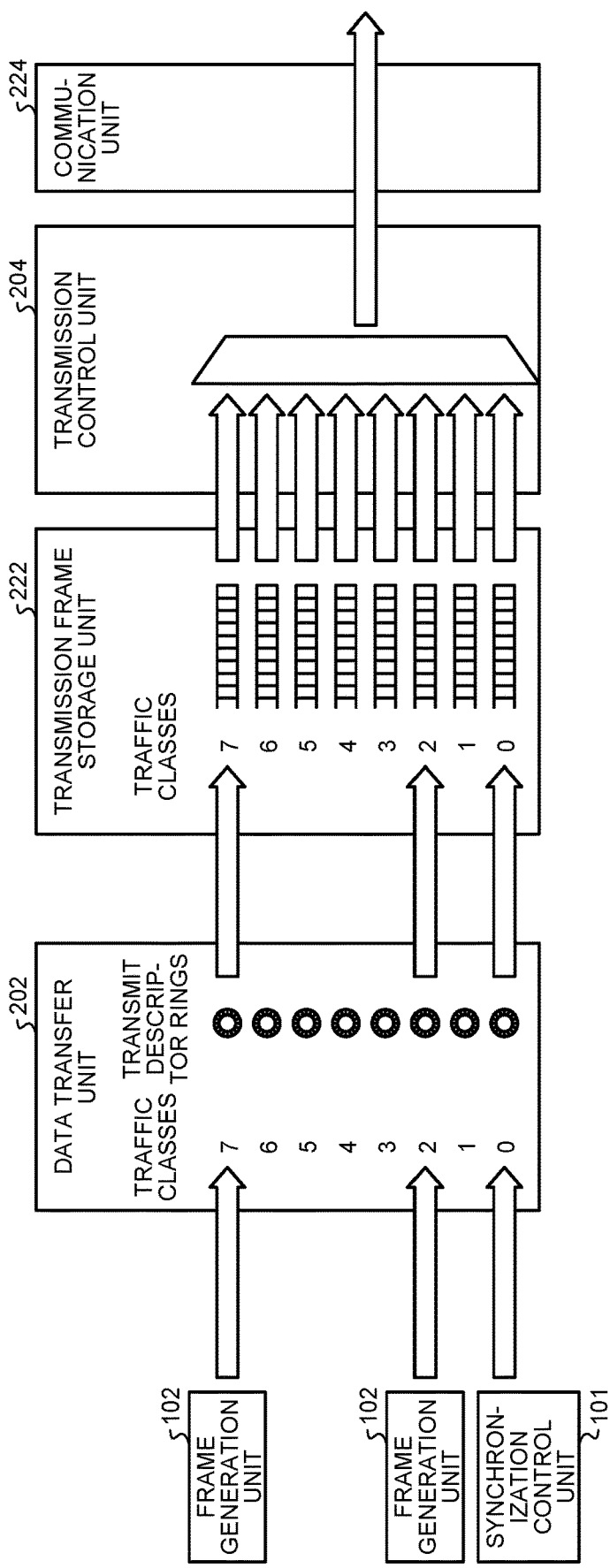
FIG. 6 is a diagram illustrating an overview of the operation of a frame transmission process.

Next, an overview of the operation of a frame transmission process and the operation of a frame reception process will be described with reference to FIGS. 6 and 7. FIG. 6 is a diagram illustrating an overview of the operation of the frame transmission process. The frame transmission process is started from the frame generation unit 102 or synchronization control unit 101. The frame generation unit 102 and the synchronization control unit 101 generate the payload data of a frame and add the header and, if necessary, footer of each protocol to generate the frame. The frame generation unit 102 and the synchronization control unit 101 select whether which traffic class is used to transmit the frame according to a characteristic or the like of the application. A transmit descriptor in the data transfer unit 202 is prepared, for example, for each traffic class. A frame to which an instruction for transfer is given using the transmit descriptor is read from the memory 1 and transferred to a corresponding queue of the transmission frame storage unit 222. Then, the transmission control unit 204 controls whether which frame is to be transmitted and use the communication unit 224 to transmit the frame. The operation of the transmission control unit 204 will be described in detail later.

Figure 7:
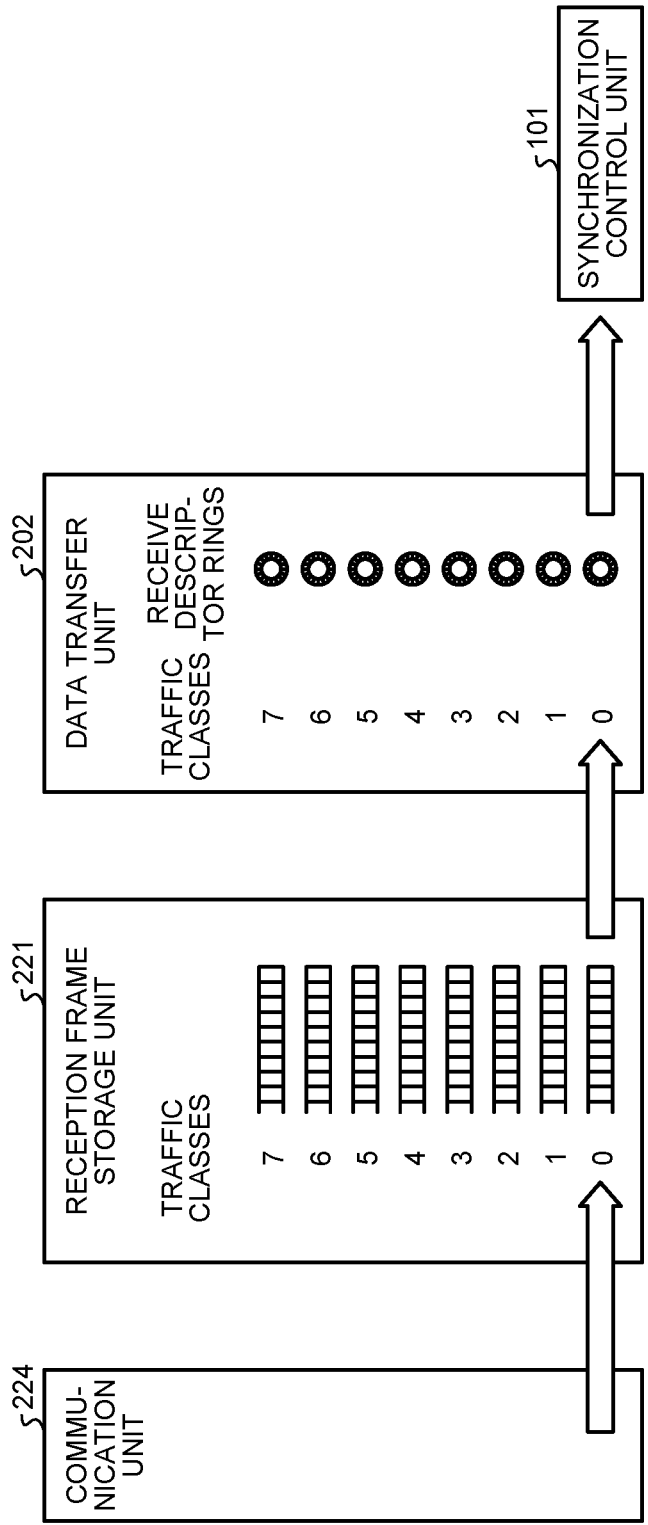
FIG. 7 is a diagram illustrating an overview of the operation of a frame reception process.

FIG. 7 is a diagram illustrating an overview of the operation of the frame reception process. The communication unit 224 uses the presence/absence of a virtual local area network (VLAN) tag in a reception frame and a priority code point (PCP) value in the VLAN tag when the VLAN tag exists to assign the reception frame to a traffic class. The reception frames are sequentially stored in corresponding queues of the reception frame storage unit 221. Then, the reception frame is stored in a memory address of the memory 1 set in a corresponding receive descriptor in the data transfer unit 202 and is passed to the synchronization control unit 101 or the like.

Figure 8:
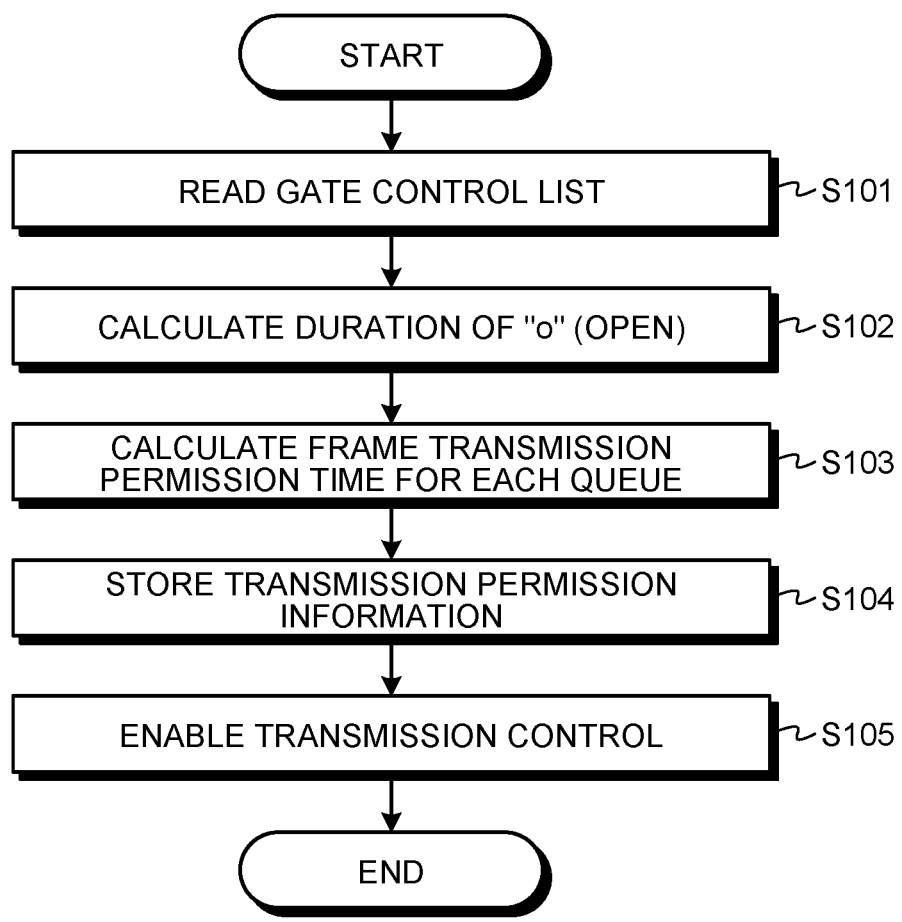
FIG. 8 is a flowchart of a transmission permission information generation process.

Next, a transmission permission information generation process will be described with reference to FIG. 8. FIG. 8 illustrates an example of a flowchart of the transmission permission information generation process. The transmission permission information generation process is performed, for example, when the gate control list is set and when a change in link speed is detected by the detection unit 105.

The transmission permission information generation unit 103 reads a gate control list from the gate control list storage unit 121 (Step S101). Here, for example, it is assumed that the gate control list illustrated in FIG. 3 is obtained.

The transmission permission information generation unit 103 calculates a duration (a continuous open duration) during which the gate state "o" of the gate control list is continued, for each traffic class (Step S102).

FIG. 9 is a diagram illustrating an example of the calculated continuous open duration. For example, in the entry T02 for the traffic class TC7, the gate state continues "o" through T02 to T03 and changes to "C" in T04. The time intervals for T02 and T03 are 512 μs and 128 μs, and thus, "o" continues for 512+128=640 μs, from the beginning of T02. Likewise, the gate state is changed to "C" in T04, and thus, "o" continues for 128 μs in T03. Note that after the last entry, the gate control list returns to the first entry. In T05, "o" continues through T05 to T00, and thus, "o" continues for 512+128=640 μs. When the gate state is always "o" as in the traffic class TC0, the continuous open duration is infinite (∞) because "o" continues unless the gate control list is changed.

Returning to FIG. 8, the transmission permission information generation unit 103 generates transmission permission information by using the continuous open duration calculated in this way. For example, the transmission permission information generation unit 103 calculates a time period in which a frame is permitted to be transmitted in each queue (a frame transmission permission time) for each relative time (reference time, reference interval) to the start (base time) of the gate control list (Step S103). The transmission permission information generation unit 103 generates the transmission permission information in which the frame transmission permission time is defined, for each relative time range. FIGS. 10 to 15 are tables each illustrating an example of generated transmission permission information.

The transmission permission information illustrated in FIG. 10 stores the continuous open duration, that is, the time period in which a frame is permitted to be transmitted (frame transmission permission time), for a traffic class, at gate switching timing. Note that the time is represented by a relative value to the start time of the gate control list. The transmission control unit 204 uses such transmission permission information to perform transmission control.

Note that FIG. 10 illustrates an example of the transmission permission information that stores the continuous open durations for all traffic classes at the gate switching timing. On the other hand, FIG. 11 illustrates an example of the transmission permission information that stores a time only when a gate is newly opened. In this example, the entry in the fourth line can be deleted.

In a case where the link speed is obtained, the continuous open duration can be converted into an amount of transmittable message (e.g., number of bytes). FIGS. 12 and 13 illustrate examples of transmission permission information in which the time indicated in FIGS. 10 and 11 is represented in bytes when the link speed is 1 Gbps. The transmission permission information that is represented in bytes makes it possible to reduce the amount of calculation. Furthermore, the relative value to the start may be expressed in bytes instead of the time. FIGS. 14 and 15 illustrate examples of transmission permission information having such a form. Note that in a case where the transmission permission information is not represented in bytes, the link speed does not need to be detected, and thus, the host processor 2 does not need to include the detection unit 105.

Returning to FIG. 8, the setting unit 104 transmits generated transmission permission information to the network interface controller 4 and causes the transmission permission information storage unit 223 of the network interface controller 4 to store the generated transmission permission information (Step S104). When the transmission permission information is stored, for example, the transmission control unit 204 enables the transmission control (Step S105).

Figure 16:
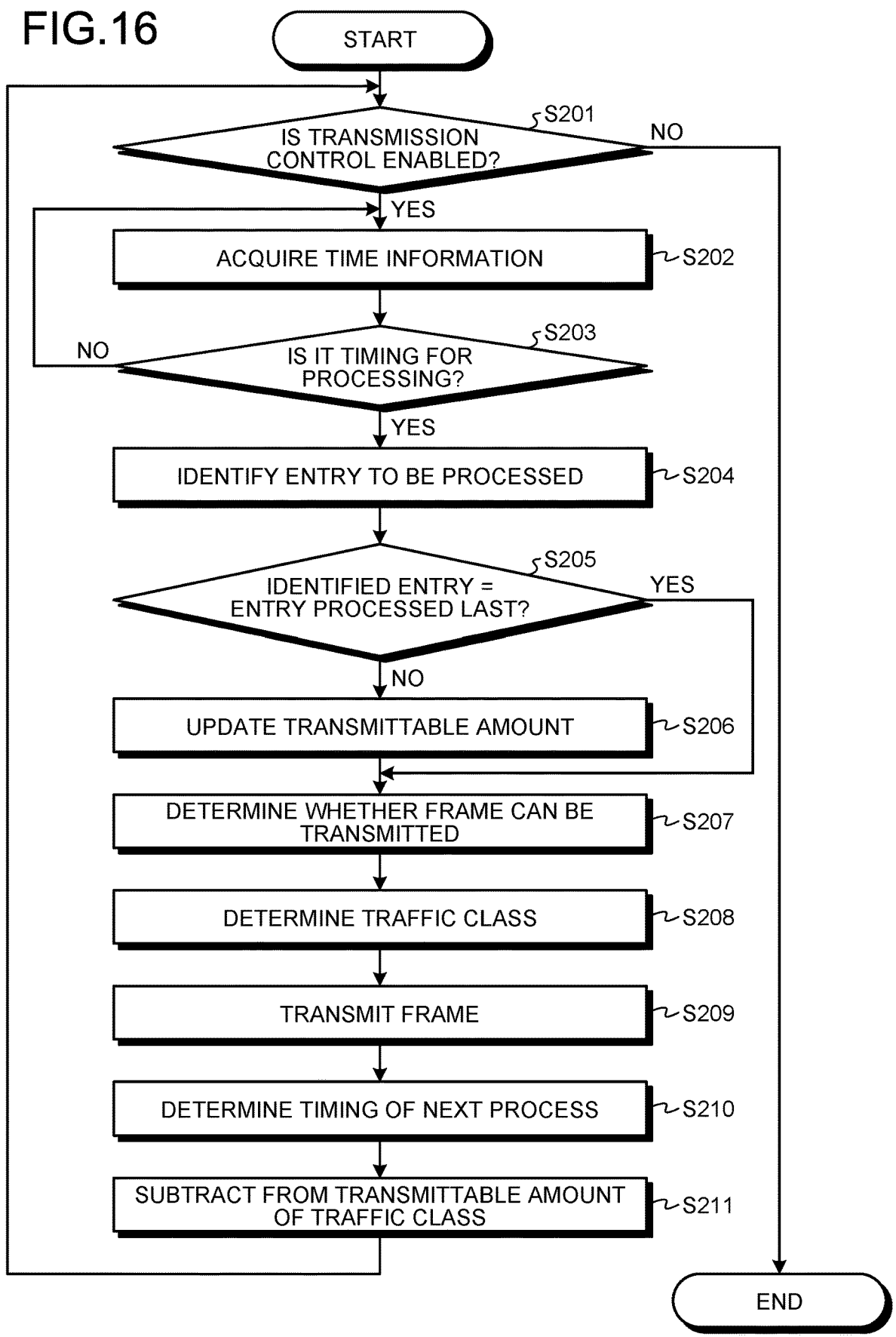
FIG. 16 is a flowchart of a transmission control process.

Next, the transmission control process executed by the transmission control unit 204 will be described with reference to FIG. 16. FIG. 16 is a diagram illustrating an example of a flowchart of the transmission control process.

First, the transmission control unit 204 determines whether transmission control is enabled (Step S201). When no transmission permission information is set, if no correct transmission permission information is set due to a change in link speed, or the like, the transmission control is disabled. When the transmission control is not enabled (disabled) (Step S201: No), the subsequent process is not executed and the process is finished.

When the transmission control is enabled (Step S201: Yes), the transmission control unit 204 acquires time information from the time management unit 201 (Step S202). The transmission control unit 204 determines whether the time indicated by the time information is the timing for processing (Step S203). The timing for processing is timing to start transmission of the next frame. This timing is determined, for example, in the previous frame transmission. Furthermore, the timing is expressed in time or bytes. The initial value is set to a value at which processing is started immediately.

When it is not the timing for processing (Step S203: No), the process returns to Step S202 and the process is repeated. When it is the timing for processing (Step S203: Yes), the transmission control unit 204 uses the time information acquired from the time management unit 201, the base time indicated by the transmission permission information, and a maximum value (maximum time) within a time range indicated by the transmission permission information, and identifies an entry of the transmission permission information that is to be referred to (Step S204).

The transmission control unit 204 determines whether the identified entry is the same as an entry processed last (Step S205). When the entries are different (Step S205: No), that is, at timing at which the entries are switched, a transmittable amount stored in a traffic class is updated (Step S206). The transmittable amount may be time or bytes. Here, it is assumed that the transmittable amount is managed together with the updated timing.

An update example when the transmission permission information of FIG. 10 is used will be described hereinafter. For example, it is assumed that the time indicated by the time information is 768 μs after the base time. In this condition, the transmission control unit 204 identifies the entry in the fourth line as a reference entry. The transmission control unit 204 sets the frame transmission permission time of each queue set in this entry as the transmittable amount (time), and records the time that is 768 μs after the base time, as the transmittable amount update time. The transmittable amount in each of the traffic classes 7, 6, 4, and 2 is set to 128 μs, and the transmittable amount in other traffic classes is set to 0 μs. Furthermore, the time after 768 μs is recorded as the transmittable amount update time for all traffic classes. In other words, in a case where the transmission permission information of FIG. 10 is used, the transmittable amounts in all queues are overwritten with the frame transmission permission time set in a new entry, when entries are switched. In addition, all the transmittable amount update time is also overwritten.

An update example in use of the transmission permission information of FIG. 11 will be described hereinafter. For example, it is assumed that the time indicated by the time information is 256 μs after the base time. In this condition, the transmission control unit 204 identifies the entry in the third line as a reference entry. The transmission control unit 204 sets the frame transmission permission time of a queue to which a value is set of the queues set in this entry, as the transmittable amount (time), and records the time that is 256 μs after the base time, as the transmittable amount update time. For a queue to which no value is set, the transmittable amount and transmittable amount update time are not updated. In this example, only the transmission permission time in the traffic class 7 is updated. Specifically, 640 μs that is set as the frame transmission permission time is set as the transmittable amount, and the time that is 256 μs after the base time is recorded. The transmittable amount and transmittable amount update time in other traffic classes are not updated. In other words, in a case where the transmission permission information of FIG. 11 is used, the transmittable amount and the transmittable amount update time are overwritten only in a traffic class in which the frame transmission permission time is set for a new entry, when entries are switched.

Returning to FIG. 16, the transmission control unit 204 acquires the size of the first frame in each traffic class of the transmission frame storage unit 222 to determine whether a frame can be transmitted for each traffic class (Step S207). The transmission control unit 204 may determine whether a frame can be transmitted in consideration of media-dependent overhead.

A determination example when the transmission permission information of FIG. 10 is used will be described hereinafter. For example, it is assumed that the time indicated by the time information is 800 μs after the base time. In this condition, in determination as to whether transmission is permitted in the traffic class 7 (TC7), the transmission control unit 204 calculates the remaining frame transmission permission time at the time indicated by the time information. This value is calculated by subtracting the time corresponding to a difference between the time indicated by the time information (800 μs) and the time at which the transmittable amount is updated (transmittable amount update time) 768 μs, from the transmittable amount. In this example, the transmittable amount (time) is 128−(800-768) =96 μs. When the time required for frame transmission is equal to or smaller than this value, the transmission control unit 204 determines that the frame can be transmitted. When the time required for frame transmission is smaller than this value, the transmission control unit 204 determines that the frame cannot be transmitted. The transmission control unit 204 may add media-dependent overhead to the time required to transmit the frame.

A determination example when the transmission permission information of FIG. 11 is used will be described hereinafter. For example, in a case where the transmission permission information of FIG. 11 is used, it is assumed that the time indicated by the time information is 800 μs after the base time. In this condition, in determining whether transmission is permitted in the traffic class 7 (TC7), the transmission control unit 204 calculates first the remaining frame transmission permission time at the time indicated by the time information. This value is calculated by subtracting the time corresponding to a difference between the time (800 μs) indicated by the time information and the time 256 μs at which the transmittable amount is updated (a transmittable amount update time), from the transmittable amount. In this example, the transmittable amount (time) is 640−(800−256) =96 μs. When the time required for frame transmission is equal to or smaller than this value, the transmission control unit 204 determines that the frame can be transmitted.

When the time required for frame transmission is smaller than this value, the transmission control unit 204 determines that the frame cannot be transmitted. The transmission control unit 204 may add media-dependent overhead to the time required to transmit the frame.

Note that, in the transmission permission information of FIGS. 10 and 11, it is assumed that the time indicated by the time information is 1536 μs after the base time. As the gate control list, this works in the same way as the elapsed time from the base time is 0 μs. In this condition, due to switching of reference entries, the transmittable amount is set to 128 μs and the transmittable amount update time is set to 0 μs for the transmission permission information of both FIGS. 10 and 11, in the traffic class 7. The frame transmission permission time used to determine whether transmission is permitted at this time is calculated by subtracting the time corresponding to a difference between the time indicated by the time information (0 μs) and the time at which the transmittable amount is updated (transmittable amount update time) 0 μs, from the transmittable amount. In this example, the transmittable amount (time) is 128−(0−0)=128 μs. When the time required for frame transmission is equal to or smaller than this value, the transmission control unit 204 determines that the frame can be transmitted.

Note that, in the case of the example of FIG. 10, the transmittable amount is updated every time entries are switched, and thus, it is not necessary to record the transmittable amount update time. In this configuration, the start time of the current entry is preferably regarded as the transmittable amount update time.

Figure 17:
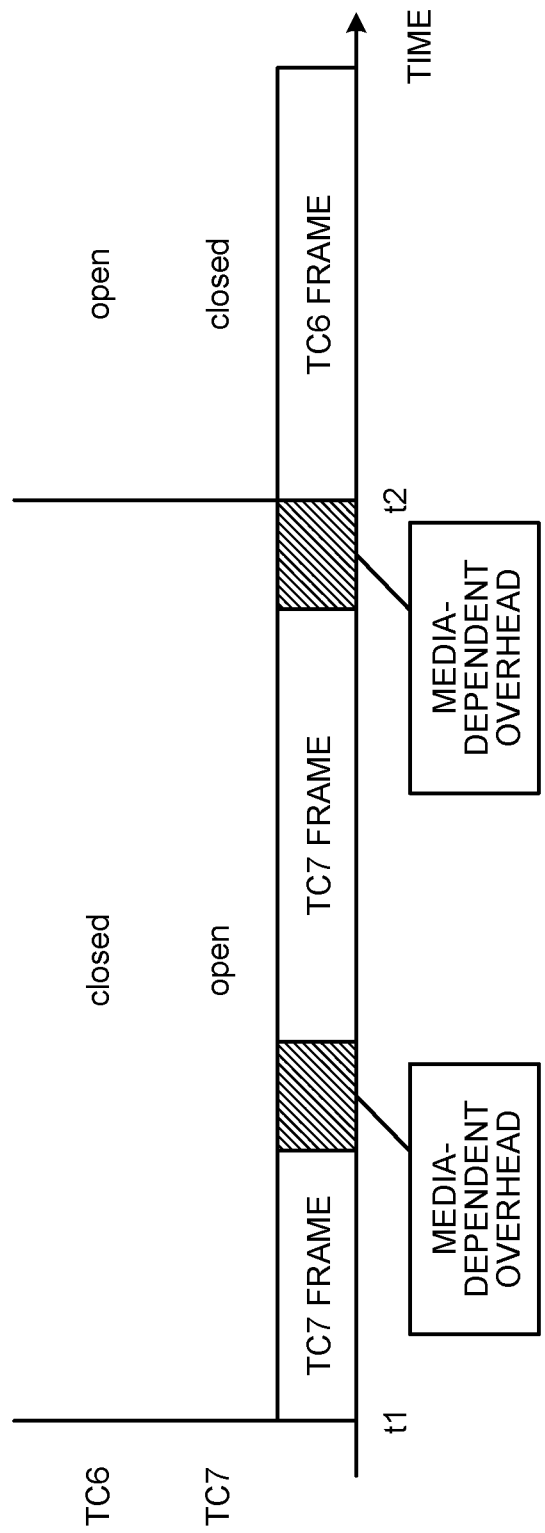
FIG. 17 is a diagram illustrating an example of media-dependent overhead.

FIG. 17 is a diagram illustrating an example of media-dependent overhead. The media-dependent overhead includes, for example, an inter-frame gap (IFG) and a preamble and start frame delimiter (SFD) of the next frame, in size. When a total value of the frame size (including FCS) and the media-dependent overhead is equal to or less than the transmittable amount, the transmission control unit 204 determines that a frame can be transmitted. Note that when the transmission permission information is represented in time, the transmission control unit 204 makes a determination after converting a frame size or the like into time by using the link speed.

The transmission control unit 204 determines, in accordance with a transmission selection algorithm, a traffic class whose first frame is to be transmitted out of traffic classes for which transmission is permitted (Step S208). When "strict priority" is used as the transmission selection algorithm, the transmission control unit 204 selects a traffic class having the highest priority, that is, a traffic class having a maximum value of identification information, out of the traffic classes for which transmission is permitted.

The transmission control unit 204 transmits the first frame stored in a queue of the selected traffic class via the communication unit 224 (Step S209).

The transmission control unit 204 determines the timing of performing a next transmission control process (Step S210). For example, the transmission control unit 204 determines timing delayed by a time required for frame transmission this time as the timing for performing the next transmission control process.

The transmission control unit 204 subtracts an amount (time or bytes) required for frame transmission from the transmittable amount in the traffic class (queue) used for the frame transmission (Step S211), and finishes the transmission control process.

As described above, the communication apparatus according to the present embodiment has the simplified hardware configuration or software processing but makes it possible to accurately operate according to the gate control list and effectively use a given communication resource.

Furthermore, it is possible to give the transmission control process real-time performance (that is, to finish the process within a predetermined time).

First Modification

Figure 18:
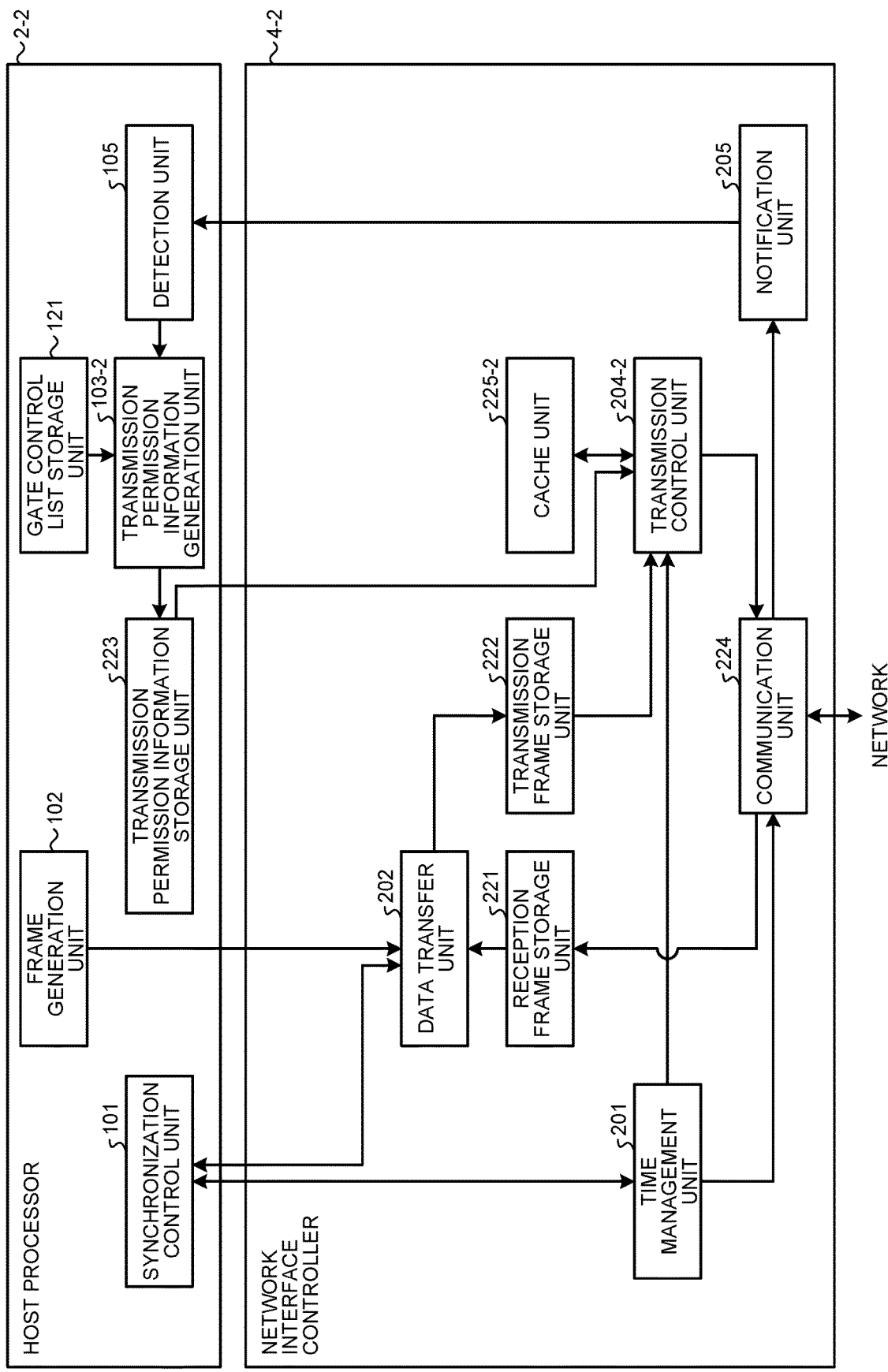
FIG. 18 is a block diagram of a communication apparatus according to a first modification.

The transmission permission information storage unit 223 may be provided in the host processor 2-2. FIG. 18 is a block diagram illustrating an example of the functional configuration of a communication apparatus (the host processor 2-2, a network interface controller 4-2) according to a first modification.

As illustrated in FIG. 18, the host processor 2-2 according to the first modification is different from the host processor 2 according to the embodiments described above in that the host processor 2-2 includes not setting unit 104 but the transmission permission information storage unit 223, and in the function of a transmission permission information generation unit 103-2. Furthermore, the network interface controller 4-2 according to the first modification is different from the network interface controller 4 according to the embodiments described above in that the network interface controller 4-2 includes not the reception unit 203 or the transmission permission information storage unit 223 but a cache unit 225-2, and in the function of a transmission control unit 204-2. The other configurations are the same as those of FIG. 2, and thus denoted by the same reference numerals, and the description thereof will be omitted.

In the first modification, the transmission permission information generation unit 103-2 stores generated transmission permission information, in the transmission permission information storage unit 223 in the host processor 2-2.

The transmission control unit 204-2 acquires transmission permission information directly from the transmission permission information storage unit 223 without using the setting unit 104 and the reception unit 203. For example, the transmission control unit 204-2 acquires transmission permission information from the transmission permission information storage unit 223 by DMA.

The cache unit 225-2 is a storage medium (temporary storage unit) configured to temporarily store at least part of transmission permission information. The cache unit 225-2 includes, for example, a storage medium that is configured to be accessed at a higher speed than the transmission permission information storage unit 223. Note that the cache unit 225-2 may not necessarily be provided.

For example, the transmission control unit 204-2 periodically reads transmission permission information from the transmission permission information storage unit 223 in advance and stores the transmission permission information in the cache unit 225-2. This makes it possible to cope with a case where a memory of the network interface controller 4-2 is not so large to store all the transmission permission information.

Second Modification

Figure 19:
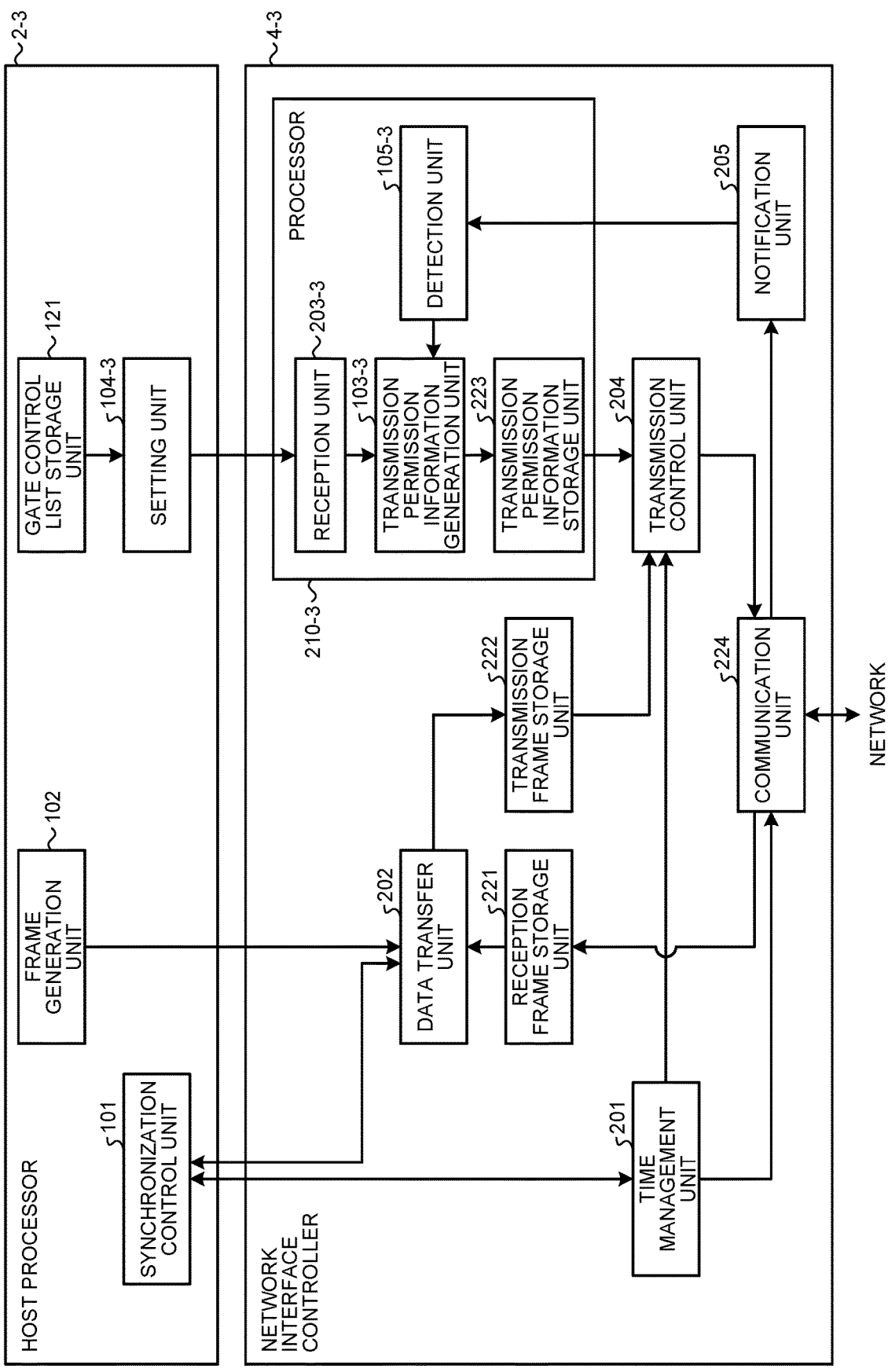
FIG. 19 is a block diagram of a communication apparatus according to a second modification.

The transmission permission information generation unit 103 and the detection unit 105 may be provided inside the network interface controller 4. FIG. 19 is a block diagram illustrating an example of the functional configuration of a communication apparatus (the host processor 2-3, a network interface controller 4-3) according to a second modification that is configured in this way.

As illustrated in FIG. 19, the host processor 2-3 according to the second modification is different from the host processor 2 according to the embodiments described above in that the host processor 2-3 includes no transmission permission information generation unit 103 or detection unit 105 and in the function of a setting unit 104-3. Furthermore, the network interface controller 4-3 according to the second modification is different from the network interface controller 4 according to the embodiments described above in that the network interface controller 4-3 includes a processor 210-3 that includes a reception unit 203-3, the transmission permission information storage unit 223, and the like. The other configurations are the same as those of FIG. 2, and thus denoted by the same reference numerals, and the description thereof will be omitted.

The setting unit 104-3 transmits a gate control list stored in the gate control list storage unit 121 to the network interface controller 4-3.

The processor 210-3 includes the reception unit 203-3, a transmission permission information generation unit 103-3, a detection unit 105-3, and the transmission permission information storage unit 223.

The reception unit 203-3 receives an input of the gate control list transmitted by the setting unit 104-3 of the host processor 2-3. The reception unit 203-3 may receive a gate control list from another device other than the host processor 2-3 over, for example, the network 200.

The transmission permission information generation unit 103-3 generates transmission permission information from the gate control list received by the reception unit 203-3.

The detection unit 105-3 detects a change in link speed via an internal bus of the network interface controller 4-3. When detecting a change in the link speed, the detection unit 105-3 instructs the transmission permission information generation unit 103-3 to generate the transmission permission information again. Other operations are the same as those in the embodiments described above.

Third Modification

Note that in the embodiments described above, a configuration including one network controller and one port has been described. A plurality of network controllers and a plurality of ports corresponding to each of the plurality of network controllers may be provided. In this configuration, transmission permission information is set for each port.

Furthermore, in the embodiments described above, the example in which the frame generation unit 102 is implemented by the host processor 2 has been described, but the frame generation unit 102 may be implemented by hardware such as FPGA and ASIC. In this configuration, the DMA function of the data transfer unit 202 may be eliminated so that data can be exchanged directly using a stream interface.

As described above, in the present embodiment, the hardware configuration or software processing is simplified but makes it possible to accurately operate according to the gate control list and effectively use a given communication resource. Furthermore, it is possible to give the transmission control process real-time performance (finish the process within a predetermined time).

The programs executed by the communication apparatus (information processing device, communication control device) according to the present embodiment is provided by being incorporated in the storage 3 and a ROM or the like, which is not illustrated, in advance. Note that, for example, in a case where the communication apparatus is implemented by FPGA, the data (configuration data) for setting the configuration of FPGA corresponds to the programs.

The programs executed by the communication apparatus according to the present embodiment may be configured to be provided as a computer program product by being recorded in a non-transitory computer-readable recording medium, such as a compact disk read only memory (CD-ROM), a flexible disk (FD), compact disk recordable (CD-R), or digital versatile disk (DVD), in an installable or executable file format.

Furthermore, the programs executed by the communication apparatus according to the present embodiment may be configured to be stored on a computer connected to a network such as the Internet so as to be provided by being downloaded over the network. Furthermore, the programs executed by the communication apparatus according to the present embodiment may be configured to be provided or distributed over a network such as the Internet.

The programs executed by the communication apparatus according to the present embodiment can cause a computer to function as the respective units of the communication apparatus described above. The computer allows the processor to load a program from a computer-readable storage medium into the main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication control device comprising:
one or more hardware processors configured to:
    obtain gate control information, the gate control information including a plurality of first entries, each first entry including open or close gate states of a plurality of gates corresponding to a plurality of queues at with a respective time interval;
    for each queue, calculate a duration during which one or a plurality of the open gate states are continued, the duration being calculated by adding a plurality of durations of a plurality of time intervals respectively corresponding to the plurality of the open gate states that are continued, and calculate, based on the calculated duration, a data amount of one or more messages that are permitted to be transmitted while the one or plurality of the open gate states are continued;
    generate transmission permission information including a plurality of second entries, each second entry corresponding to a range of relative times, each relative time being a time from a base time at which gate control is started, each second entry including the calculated data amount as a data amount of one or more messages that are permitted to be transmitted at a start time of the range;
    store the generated transmission permission information in a storage device; and
    perform control of transmission of one or more messages based on the transmission permission information that is read from the storage device.

2. The device according to claim 1, wherein the one or more hardware processors are configured to:
    perform the control of transmission of one or more messages by opening and closing the gate based on the transmission permission information.

3. The device according to claim 1, further comprising a temporary storage that temporarily stores the transmission permission information received from the storage device by the DMA, wherein
the one or more hardware processors are configured to perform the control of transmission of one or more messages by opening and closing the gate, based on the transmission permission information stored in the temporary storage.

4. The device according to claim 1, wherein the transmission permission information is generated based on the gate control information and a speed of communication for transmission of one or more messages.

5. The device according to claim 1, wherein the one or more hardware processors are configured to:
    transmit one or more messages when the size of the one or more messages is equal to or smaller than the data amount of the transmittable messages.

6. The device according to claim 1, wherein
the data amount of the transmittable messages is number of bytes of the transmittable messages.

7. The device according to claim 1, wherein the one or more hardware processors are configured to:
    transmit one or more messages in accordance with the control.

8. The device according to claim 1, wherein
the data amount is calculated based on a link speed and the duration, the link speed being a speed of communication by the communication control device.

9. The device according to claim 8, wherein
the one or more hardware processors are configured to:
    detect a change in the link speed, and
    calculate the data amount when the change in the link speed is detected.

10. The device according to claim 8, wherein
the relative time is expressed by data amount of transmittable messages.

11. The device according to claim 1, wherein the one or more hardware processors are configured to:
    identify one of the plurality of second entries corresponding to a time of the control of transmission performed, based on the range of the relative times,
    subtract a difference from the data amount of the identified one of the plurality of second entries, the difference being a data amount corresponding to a time between the time of the control of transmission performed and the start time of the range corresponding to the identified one of the plurality of second entries, and
    determine whether the one or more messages are transmittable using a result of subtraction.

12. An information processing device comprising:
one or more hardware processors configured to:
    obtain gate control information, the gate control information including a plurality of first entries, each first entry including open or close gate states of a plurality of gates corresponding to a plurality of queues with a respective time interval;
    for each queue, calculate a duration during which one or a plurality of the open gate states are continued, the duration being calculated by adding a plurality of durations of a plurality of time intervals respectively corresponding to the plurality of the open gate states that are continued, and calculate, based on the calculated duration, a data amount of one or more messages that are permitted to be transmitted while the one or plurality of the open gate states are continued; and
    generate transmission permission information including a plurality of second entries, each second entry corresponding to a range of relative times, each relative time being a time from a base time at which gate control is started, each second entry including the calculated data amount for each queue as a data amount of one or more messages that are permitted to be transmitted at a start time of the range.

13. The device according to claim 12, further comprising: transmission permission information storage that stores the transmission permission information generated by the one or more hardware processors and outputs the stored transmission permission information to a communication control device according to direct memory access (DMA).

14. The device according to claim 12, wherein the one or more hardware processors are configured to generate the transmission permission information, based on the gate control information and a speed of communication for transmission of one or more messages.

15. The device according to claim 14, wherein the one or more hardware processors are configured to:
    detect the speed; and
    generate the transmission permission information based on the gate control information and the detected speed.

16. A communication control method implemented by a computer, the method comprising:
    obtaining gate control information, the gate control information including a plurality of first entries, each first entry including open or close gate states of a plurality of gates corresponding to a plurality of queues with a respective time interval;
    for each queue, calculating a duration during which one or a plurality of the open gate states are continued, the duration being calculated by adding a plurality of durations of a plurality of time intervals respectively corresponding to the plurality of the open gate states that are continued, and calculating, based on the calculated duration, a data amount of one or more messages that are permitted to be transmitted while the one or plurality of the open gate states are continued;
    generating transmission permission information including a plurality of second entries, each second entry corresponding to a range of relative times, each relative time being a time from a base time at which gate control is started, each second entry including the calculated data amount for each queue as a data amount of one or more messages that are permitted to be transmitted at a start time of the range;
    storing the generated transmission permission information in a storage device; and
    performing control of transmission of one or more messages based on the transmission permission information that is read from the storage device.

17. A computer program product comprising a non-transitory computer-readable recording medium on which an executable program is recorded, the program instructing a computer to:
    obtain gate control information, the gate control information including a plurality of first entries, each first entry including open or close gate states of a plurality of gates corresponding to a plurality of queues with a respective time interval;
    for each queue, calculate a duration during which one or a plurality of the open gate states are continued, the duration being calculated by adding a plurality of durations of a plurality of time intervals respectively corresponding to the plurality of the open gate states that are continued, and calculate, based on the calculated duration, a data amount of one or more messages that are permitted to be transmitted while the one or plurality of the open gate states are continued;
    generate transmission permission information including a plurality of second entries, each second entry corresponding to a range of relative times, each relative time being a time from a base time at which gate control is started, each second entry including the calculated data amount for each queue as a data amount of one or more messages that are permitted to be transmitted at a start time of the range;
    store the generated transmission permission information in a storage device; and
    perform control of transmission of one or more messages based on the transmission permission information that is read from the storage device.

18. An information processing method implemented by a computer, the method comprising:
    obtaining gate control information, the gate control information including a plurality of first entries, each first entry including open or close gate states of a plurality of gates corresponding to a plurality of queues with a respective time interval;
    for each queue, calculating a duration during which one or a plurality of the open gate states are continued, the duration being calculated by adding a plurality of durations of a plurality of time intervals respectively corresponding to the plurality of the open gate states that are continued, and calculating, based on the calculated duration, a data amount of one or more messages that are permitted to be transmitted while the one or plurality of open gate states are continued; and
    generating transmission permission information including a plurality of second entries, each second entry corresponding to a range of relative times, each relative time being a time from a base time at which gate control is started, each second entry including the calculated data amount for each queue as a data amount of one or more messages that are permitted to be transmitted at a start time of the range.

19. A computer program product comprising a non-transitory computer-readable recording medium on which an executable program is recorded, the program instructing a computer to:
    obtain gate control information, the gate control information including a plurality of first entries, each first entry including open or close gate states of a plurality of gates corresponding to a plurality of queues with a respective time interval;
    for each queue, calculate a duration during which one or a plurality of the open gate states are continued, the duration being calculated by adding a plurality of durations of a plurality of time intervals respectively corresponding to the plurality of the open gate states that are continued, and calculate, based on the calculated duration, a data amount of one or more messages that are permitted to be transmitted while the one or plurality of the open gate states are continued; and
    generate transmission permission information including a plurality of second entries, each second entry corresponding to a range of relative times, each relative time being a time from a base time at which gate control is started, each second entry including the calculated data amount of one or more messages that are permitted to be transmitted while the one or plurality of the open gate states are continued for each queue as a data amount of one or more messages that are permitted to be transmitted at a start time of the range.

20. A communication control device comprising:
one or more hardware processors configured to:
  obtain one of a plurality of second entries included in transmission permission information that is generated in advance based on gate control information, the gate control information including a plurality of first entries, each first entry including open or close gate states of a plurality of gates corresponding to a plurality of queues with a respective time interval; and
  perform control of transmission of one or more messages based on the obtained second entry,
wherein
  each second entry corresponds to a range of relative times,
  each relative time is a time from a base time at which gate control is started,
  each second entry includes a data amount for each queue as a data amount of one or more messages that are permitted to be transmitted at a start time of the range,
  the data amount is calculated based on a duration during which one or a plurality of the open gate states are continued, and the data amount is a data amount of one or more messages that are permitted to be transmitted while the one or plurality of the open gate states are continued, and
  the duration is calculated by adding a plurality of durations of a plurality of time intervals respectively corresponding to the plurality of the open gate states that are continued.

21. The device according to claim 20, wherein the one or more hardware processors are configured to:
  identify one of the plurality of second entries corresponding to a time of the control of transmission performed based on the range of the relative times,
  subtract a difference from the data amount of the identified one of the plurality of second entries, the difference being a data amount corresponding to a time between the time of the control of transmission performed and the start time of the range corresponding to the identified one of the plurality of second entries, and
  determine whether the one or more messages are transmittable using a result of subtraction.

22. A communication control device comprising:
one or more hardware processors configured to:
  obtain one of a plurality of second entries included in transmission permission information that is generated in advance based on gate control information, the gate control information including a plurality of first entries, each first entry including open or close gate states of a plurality of gates corresponding to a plurality of queues with a respective time interval; and
  perform control of transmission of one or more messages based on the obtained second entry,
wherein
  each second entry includes a data amount for each queue as a data amount of one or more messages that are permitted to be transmitted at a start time of the second entry,
  the data amount is calculated based on a duration during which one or a plurality of the open gate states are continued, and the data amount is a data amount of one or more messages that are permitted to be transmitted while the one or plurality of the open gate states are continued, and
  the duration being calculated by adding a plurality of durations of a plurality of time intervals respectively corresponding to the plurality of the open gate states that are continued.

* * * * *